Oct. 30, 1962 W. DIX ETAL 3,061,386
TOLERANCE RINGS
Original Filed Aug. 8, 1958 3 Sheets-Sheet 1

SHAFT: I - MAXIMUM DIAMETER, "0"
II - MINIMUM DIAMETER, "-a"

BORE: III - MAXIMUM DIAMETER, "0"
IV - MINIMUM DIAMETER, "-a"

RETENTION FORCE: $H_r = Z \cdot P \cdot \mu$

ROTATIONAL MOMENT: $M_t = \dfrac{H_r \cdot D}{2}$

SPRING MOVEMENT: $f = \dfrac{(D + 2h) - d_1}{2}$

SPRING STIFFNESS: $c = \dfrac{P}{f}$

INVENTORS
WILLY DIX
GEORG WEHR
BY Hauser and Nydick
ATTORNEYS

Oct. 30, 1962   W. DIX ETAL   3,061,386
TOLERANCE RINGS

Original Filed Aug. 8, 1958   3 Sheets-Sheet 3

INVENTORS
WILLY DIX
GEORG WEHR
BY
Haare and Nydick
ATTORNEYS

United States Patent Office 3,061,386
Patented Oct. 30, 1962

3,061,386
TOLERANCE RINGS
Willy Dix, Bad Kissingen, and Georg Wehr, Rotenburg an der Fulda, Germany, assignors to Deutsche Star Kugelhalter, G.m.b.H., Schweinfurt, Germany, a body corporate of Germany
Continuation of application Ser. No. 753,917, Aug. 8, 1958. This application Oct. 4, 1961, Ser. No. 144,005
4 Claims. (Cl. 308—184)

The present invention relates to a springy tolerance sleeeve or ring for fitting a component of circular peripheral outline in a receiver opening of also circular peripheral outline with a tight or pressure seating or fit, that is, a fit such that the component to be fitted will not turn within the opening.

Tolerance sleeves used for effecting such tight or pressure fit may be subjected either to a static load or a dynamic load. The sleeve is subjected to a static load for instance when a rotational moment is to be transmitted from the component to the body having the receiver opening and vice-versa; and the sleeve is subjected to a dynamic load for instance when it is used to seat the inner and outer cage ring of a bearing, respectively, upon the rotary shaft and in the structure in which the shaft is mounted or of which it constitutes part.

Theoretically, the problem of seating a shaft or round rod in a receiving opening, which is one frequently encountered in manufacture, is a very simple one. All that is necessary is to co-relate the diameters of the component to be seated and of the opening so that the desired pressure fit is obtained. However, as is evident, the correlation of the diameters requires machining with such close tolerances that this solution is economically not practical in very many instances. Accordingly, many attempts have been made to eliminate the need for very close tolerances by interposing compensating elements between the component to be seated and the receiving opening. None of the heretofore known compensating elements including springy tolerance sleeves or rings as now available, have been found fully satisfactory. Again the problem of designing satisfactory tolerance or compensating elements is theoretically a simple one. However, as will be shown in the subsequent detailed investigation, various unexpected and difficult problems are involved. Among the problems encountered in designing tolerance elements capable of compensating tolerances within an economically acceptable range may be mentioned the need for reliable resistance against turning or slipping of the seated component, for sufficient resistance of the springy sleeeve used as tolerance element to the static or dynamic load to which it may be subjected and for centering the component to be seated in the opening.

Accordingly, one of the objects of the invention is to provide a novel and improved springy tolerance sleeeve which compensates for variations in the diameters of the component and the receiving opening within an economically satisfactorily wide range.

Another object of the invention is to provide a novel and improved springy tolerance sleeve which engages the surfaces to be held stationary relative to each other with a force of retention high enough to prevent slipping or turning of the seated component without scoring or marring either of the surfaces.

Still another object of the invention is to provide a novel and improved springy tolerance sleeve, the structure of which is such that the sleeeve is capable of absorbing the stationary or dynamic loads for which it is designed without experiencing a permanent deformation that may cause a collapse of the sleeve.

A further object of the invention is to provide a novel and improved springy tolerance sleeve, the design of which prevents a deformation of the sleeve such that the axis of the component becomes eccentric relative to the center axis of the opening to an unacceptable extent.

Other and further objects, features and adavntages of the invention will be pointed out hereinafter and set forth in the appended claims forming part of the application.

The present application is a continuation of application Serial No. 753,917, filed August 8, 1958, now abandoned. Application Serial No. 753,917 is a continuation-in-part of application Serial No. 224,558, filed May 4, 1951, now abandoned.

In the accompanying drawing the problems involved in the design of fully satisfactory tolerance rings or sleeves are illustrated by means of comparative graphs and several preferred embodiments of the application are shown by way of illustration and not by way of limitation.

In the drawing:
FIGURE 1 shows diagrammatically the tolerance fields of a shaft and a receiving opening which must be compensated by a tolerance means.

Figure 1:
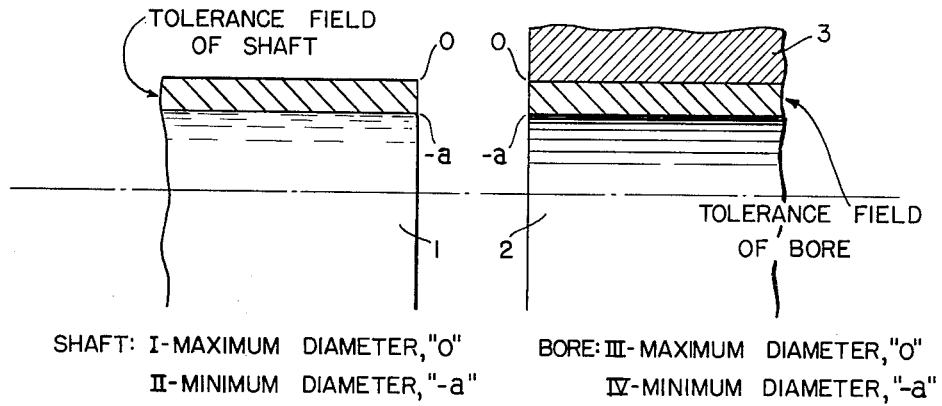

Referring first to FIGURE 1 in detail, this figure shows a shaft or journal 1 to be seated with a pressure or tight fit in a bore 2 of a body 3. In FIGURE 1 it is assumed that the diameters of the shaft and the bore are equal and that said equal diameters are the maximum allowed diameters for both the shaft and the bore. It is further assumed that the range of tolerances is in the minus range for both the shaft and the bore as is indicated by the hatched areas designated 0 to $-a$. The following table represents the four possible limit conditions under the above assumption:

|  | I+III | I+IV | II+III | II+IV |
|---|---|---|---|---|
| Shaft | 0 | 0 | $-a$ | $-a$. |
| Bore | 0 | $-a$ | 0 | $-a$. |
|  | Slidable Fit. | Pressure Fit. | Fit with Play. | Slidable Fit. |

As is evident, three of the possible limit conditions are unsuitable for obtaining a pressure fit whereas the fourth limit condition is theoretically possible. However, it calls for utilization of the entire tolerance range and for all practical purposes it cannot be used as the shaft may crack the bore if there is the slightest plus departure from the assumed tolerance range. Theoretically the danger of cracking may be controlled by adjusting the relative tolerances of the shaft and the bore. But, such adjustment involves complicated machining operations and time-consuming setting of the machine tools. As has been pointed out before, close tolerances involve costly machining operations and are hence avoided in industry whenever possible.

As also mentioned before, various compensating means have been developed. These compensating means generally involve the insertion of an elastic element between the shaft and the bore wall. Among the known elastic elements the most satisfactory ones are springy rings formed of a corrugated ribbon having corrugations extending across the width of the ribbon. The apices only of the corrugations engage the surfaces of the shaft and the bore under pressure and the resulting friction retains the shaft relative to the bore wall. While tolerance rings of that kind are a step in the right direction, the design of the rings as heretofore known does not fully satisfy the afore-outlined conditions as will appear from the subsequent discussion, and it is a basic object of this invention to eliminate the shortcomings of the ring or sleeve designs, as heretofore known.

The corrugations of a ring are subjected to a radial compression when the ring is forced between the wall of a receiving opening and the wall of the component to be seated. Such compression of the corrugations produces a spring force P in each corrugation. This force is the result of a spring movement $f$ and the spring stiffness $c$ which may be expressed by the equation:

$$P = c \cdot f \text{ kg.}$$

Figure 2:
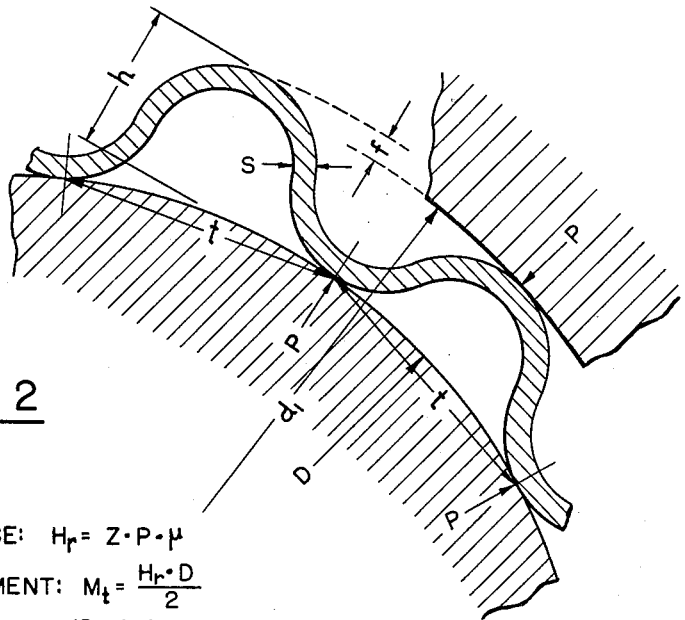
FIGURE 2 shows diagrammatically the physical magnitudes involved in the functioning of a tolerance means in the form of a springy tolerance sleeve or ring.

As is shown in FIGURE 2, at each point of contact of the corrugation apices with the bore wall and the shaft wall respectively, a frictional force is produced, the value of which is determined by the spring force P and the frictional factor $\mu$. The sum total of the individual forces of friction ($P \cdot \mu$) represents the force of retention at the joint forced which may be expressed by the equation:

$$H_r = z \cdot P \cdot \mu \text{ kg.}$$

where $H_r$ is the force of retention and $z$ the number of corrugations.

Consequently, the number of $z$ of the corrugations determines the force with which the shaft is held stationary in the opening against a rotational moment or an axial pull when the spring stiffness $c$, the spring movement $f$, the friction factor $\mu$ and the diameter D of the shaft are fixed. The moment of rotation may be expressed by the following equation:

$$M_t = z \cdot c \cdot f \cdot \mu \frac{D}{2} \frac{\text{kg.}}{\text{cm.}}$$

where $M_t$ is the moment of rotation.

The respective equations are entered in FIGURE 2 and will be evident from the reference letters of the figure.

As has been previously mentioned, it is essential that the tolerance sleeve does not cause scoring or marring of the surfaces between which it is fitted. To satisfy this condition, the pressure upon a given unit of engaged surface area must be kept within acceptable limits. Accordingly, the number of corrugations upon which the total force of retention $H_r$ is distributed must be sufficiently high. The spring movement $f$ which the corrugations permit depends upon the selected tolerances. As stated before, one of the objects of the invention is to increase the acceptable range of tolerances above the values heretofore acceptable in connection with pressure fits. Obviously, larger tolerances afford the advantage of reduced manufacturing costs since they entail less precision machining. The distance of the spring movement $f$ is obviously materially affected by the used tolerances. At the same time, it is essential that the variations in the spring movement $f$ affect the force of retention within such limits only that a pressure fit is obtained.

As is evident, changes in the tolerances do not have the same effect when a spring tolerance ring is used in connection with a pressure fit as they would have for a rigid pressure fit as the springly ring can and will follow automatically the variations in the tolerances, to a certain extent. It is further evident that the effect of variations in the tolerances is the less marked the softer the spring action of the ring is. These facts would seem to suggest the advisability of rings having a low spring stiffness $c$, that is, rings having shallow corrugations and a relatively wide spacing of the corrugations. However, the use of comparatively soft tolerance rings is not a practical solution of the problem. One of the basic requirements in seating any circular component in a receiving opening, such as of a shaft in a bore, is that the center axes of the shaft or other component and the bore coincide. When the springiness of the corrugations is low, the displacement of the axis of the shaft to the axis of the bore becomes high. Hence, such displacements are not acceptable the requirement for the coincidence of the center axis calls for a high springiness of the corrugations, that is, rings, the corrugation of which having small spacings and high amplitudes. Accordingly, there are two contradictory aspects to be satisfied. However as the heretofore known rings do not take account of these contradictory aspects, it is now apparent, the use of conventional tolerance rings formed by corrugated ribbons, that is, ribbons the corrugations of which extend across the entire width of the ribbon does not afford a marked advantage over a rigid installation, that is, an installation without the interposition of an elastic tolerance element.

The previous observations were concerned with pressure fits subjected to a static load as exerted by a moment of rotation or an axial pull. The conditions are even more unfavorable when conventional tolerance rings in the form of corrugated ribbons are subjected to a dynamic load. As is evident, the circumferential distance between apices of each two adjacent corrugations will be changed due to the radial compression experienced by the corrugation directly opposite the load. Such changes result automatically in a reduction of the stiffness of the spring material directly opposite the load which has the cumulative effect that the action of the load becomes still stronger thereby causing finally a destruction of the tolerance ring. For that reason, it is practically impossible to use springy tolerance rings or sleeves as heretofore known for the installation of roller bearings. In such installations, the tolerance rings must absorb the load to which the bearing is subjected, in addition to compensating for the manufacturing tolerances. Tests have shown that the rings are rapidly and permanently pressed out of shape due to the continuous changes in the load upon the bearings. As a result, the rings lose very soon their initial springiness and, hence, cannot prevent a loosening of the bearing rings.

Figure 3:
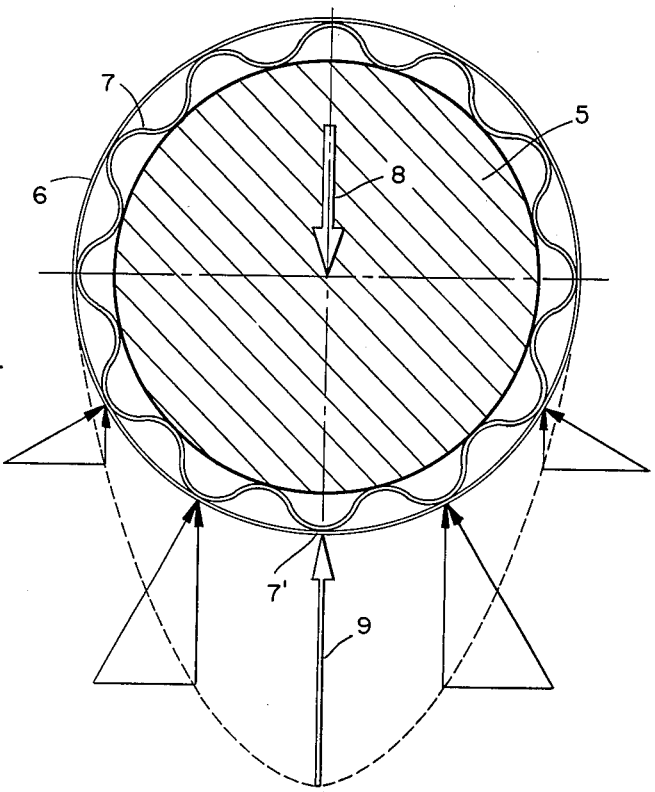
FIGURE 3 shows diagrammatically the effect of a dynamic load upon a springy tolerance sleeve.

FIGURE 3 shows a shaft 5 which should be visualized as being journalled in an inner bearing ring 6 only diagrammatically indicated. A tolerance ring 7 is interposed between the bearing ring and the shaft. The load is presumed to be downward as indicated by a heavy arrow 8. As a result the highest load, indicated by arrow 9 must be taken up by the corrugation 7′ whereas the loads to be taken up by the corrugations on both sides of corrugation 7′ become successively smaller as indicated by the vector diagrams. The load 9 tends to flatten corrugation 7′ thereby causing that corrugation to spread laterally. The lateral spreading force is not opposed by an equal force in opposite direction, due to the lower loads acting upon the adjacent corrugations. This effect is cumulative as each successive corrugation, as seen from load 9, takes up less load. The resulting strong and repeated deformation of the corrugations results in a rapid and permanent deformation causing a loss of springiness and a final destruction of the tolerance ring, or at least of its effectiveness.

Figure 4:
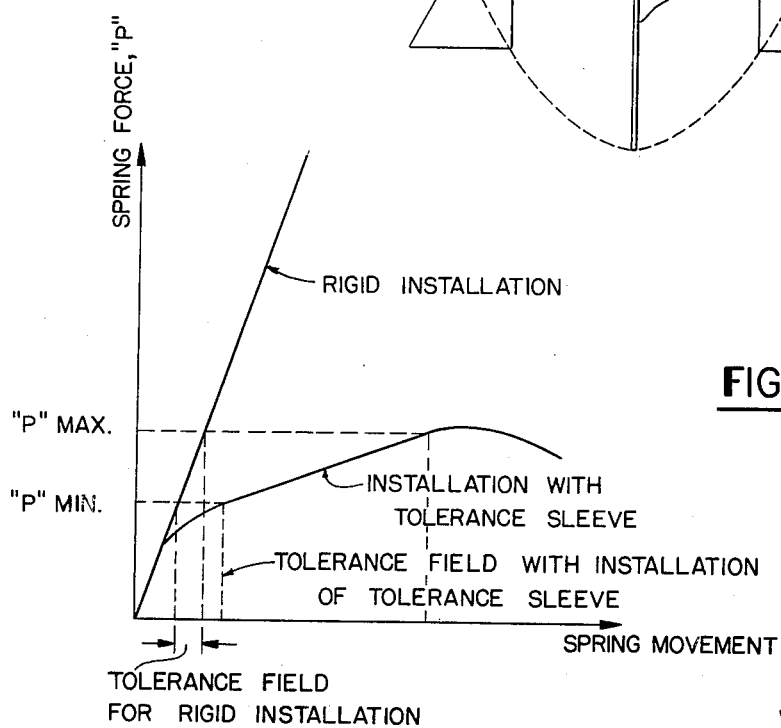
FIGURE 4 is a comparative graph demonstrating the effect of a tolerance sleeve according to the invention.
Figure 5:
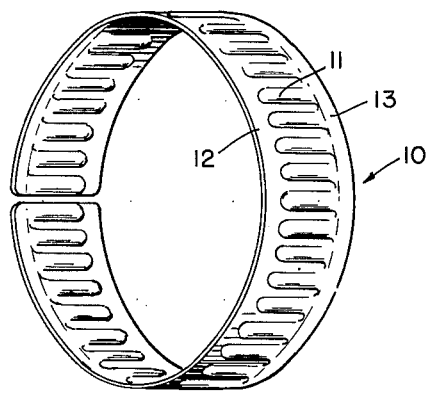
FIGURE 5 is a perspective view of a tolerance sleeve or ring according to the invention.

As appears from the previous analysis, it is inherent in the structure of corrugations extending across the entire width of the tolerance ring, that low corrugation amplitude is combined with high spring stiffness and vice-versa, that high corrugation amplitude is combined with low spring stiffness. It is further apparent from the previous analysis that rings having such basic characteristics are inherently incapable of performing satisfactorily. The inventors herein have conceived that only rings or sleeves can satisfy the aforementioned requirements, the corrugation of which cannot spread laterally by the pressure of a load and have a high springiness at the beginning of the compression and a low sprininess when further compressed. In a satisfactory ring the relation between the spring movement of the corrugations and the force required to cause such movement should be approximately as is shown in FIGURE 4. This figure also shows, by way of comparison, the conditions for a rigid installation, that is, without the interposition of a springy tolerance ring. In a rigid installation, the spring force P increases rapidly along a very steep linear line. Accordingly, the acceptable tolerance field as defined by P minimum and P maximum is a very narrow one; hence precision machining is required. In contradistinction thereto, in an installation employing a tolerance ring according to the invention, that is, a ring having a low corrugation amplitude and a low spring stiffness, the spring force P increases first comparatively rapidly, then the increase becomes rather shallow, and finally there is a marked drop in the force P when the spring capacity of the corrugations is exhausted and the spring material begins to undergo a permanent deformation. When the load increases over the value necessary to establish the retention forces, that is, the amount of compression of the corrugations reaches a certain limit, the springiness of the corrugations changes radically, as the closed ends of the corrugations will participate less in carrying the load after a certain deformation has been reached.

FIGURE 4 shows in a second graph the relation of the force P to the spring movement $f$ of a tolerance ring according to the invention. As can be readily seen, the tolerance field is of a width such that all practically used tolerances can be bridged. When the bore has its maximum diameter and the shaft its minimum diameter, the corrugations of the ring will be compressed already to such an extent that the force P minimum required for the pressure fit is produced. As a result, the force P can then vary only between the comparatively narrow limits of P minimum and P maximum within the possible tolerance field 0 to $-a$ as defined in FIGURE 1.

According to the invention, the corrugations of conventional rings or sleeves which extend across the entire width of the ring are replaced by transverse corrugations which terminate short of each circumferential edge of the ring and smooth marginal strips are provided along each transverse end of the corrugations. The corrugations themselves are preferably of sine-shaped cross section and the ends of the corrugations are each faired into the smooth marginal strips by a smoothly rounded end portion preferably forming approximately segments of an ellipsoid or sphere.

The specific configuration of the tolerance rings or sleeves according to the invention will now be described in connection with FIGURES 5 through 10. As is shown in these figures, the tolerance ring or sleeve generally designated by 10 is made of a metal ribbon of suitable springy metal and suitable gauge, generally a gauge of 0.2 to 0.8 mm. The ring has a circumferential middle portion and two circumferential outer portions. The middle portion is corrugated along its entire circumference to form corrugations 11 whereas the outer portions 12 and 13 are smooth strips. Both ends of each corrugation are closed by being faired into the respective smooth strip 12 or 13 by a rounded end portion 11'. The corrugations when cut along a circumferential line define a sine-line as can best be seen in FIGURE 8. Each end portion 11' joins the rounded apex portion of the respective corrugation to the respective smooth outer strip so as to form a smoother rounded configuration gradually flattening out into the flat marginal strip. The rounding of each edge portion constitutes approximately a segment of an ellipsoidal geometrical configuration.

Figure 5A:
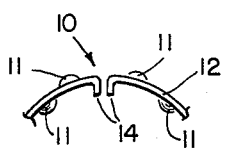
FIGURE 5a is a fragmentary circumferential section of the sleeve.

The ring is preferably transversely split and the adjacent ends are bent inwardly to form butt portions 14 as shown in FIGURE 5a.

Figure 6:
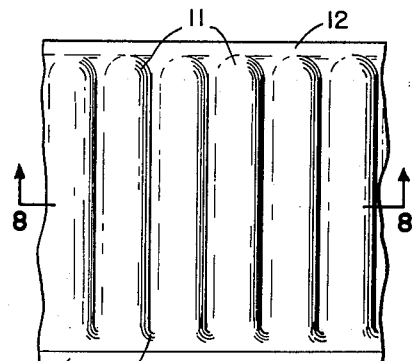
FIGURE 6 is a fragmentary enlarged plan view upon one side of the tolerance sleeve according to FIGURE 5.
Figure 7:
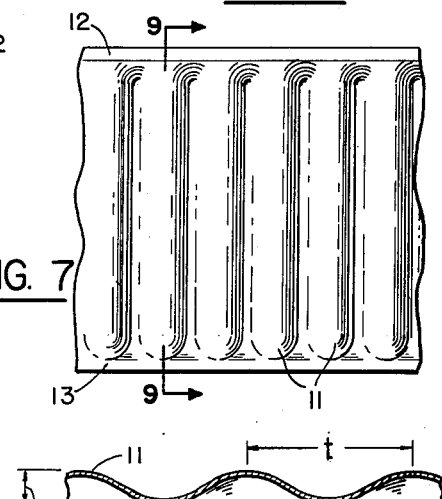
FIGURE 7 is a plan view upon the opposite side of FIGURE 6.
Figure 9:
FIGURE 9 is a section taken on line 9—9 of FIGURE 7.
Figure 10:
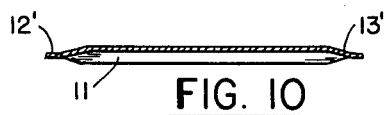
FIGURE 10 is a section similar to FIGURE 9 of a modification of the tolerance sleeve.

In FIGURES 6, 7 and 9 one of the marginal strips is disposed coplanar or aligned with the plane of the apices on one side of the ring and the other is disposed coplanar or aligned with the apices on the other side of the ring. However, as shown in FIGURE 10, the marginal smooth strips 12 and 13 may also be disposed in a circumferential plane intermediate of the apices of the corrugations.

As is evident, corrugations closed at both ends by smoothly rounded end portions and smooth strips extending along the corrugations, have inherently a much higher stiffness than the conventional open corrugations, that is, corrugations which extend to the circumferential edges of the ribbon. Furthermore, the marginal strips, being not stretchable, also fix the circumferential distance $t$ between the apices of each two adjacent corrugations.

As a result, the corrugations cannot be readily flattened by a static load or even by a dynamic load such as has been explained in connection with FIGURE 3 and the circumference of the ring cannot be appreciably expanded by the pressure of a load. In other words, corrugations according to the invention show approximately the desirable attitude of the respective graph of FIGURE 4.

The specific dimensions of a tolerance ring or sleeve according to the invention can be readily calculated as has been previously explained. The equations for calculating the tolerance ring pre-suppose that the spring stiffness is known. It has been found that the spring stiffness of a tolerance ring or sleeve according to the invention can be calculated with sufficient accuracy for the part of the graph according to FIGURE 4 which is the one important in practice from the ratio of thickness of the ring material to the spacing $t$ of the apices cubed and multiplied with the module E of elasticity of the material, the width of the ring and an empirically determined correction factor. Accordingly, the calculation of the spring stiffness $c$ may be expressed by the equation:

$$C = \left(\frac{s}{t}\right) 3.6 . E . b \frac{\text{kg.}}{\text{cm.}}$$

Figure 11:
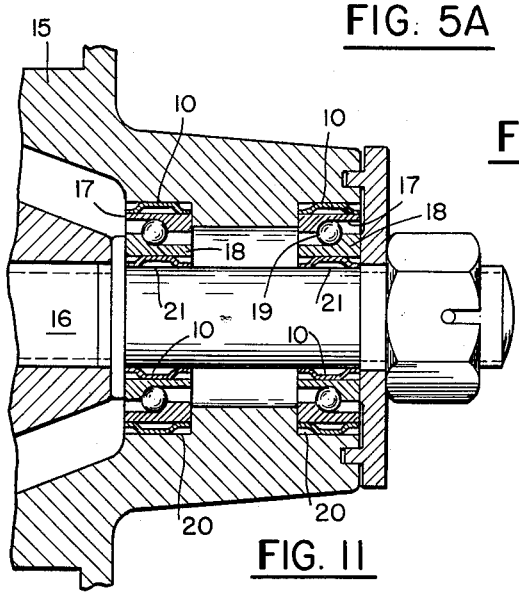
FIGURE 11 is a sectional view of a bearing seated by means of tolerance sleeves or rings according to the invention.
Figure 8:
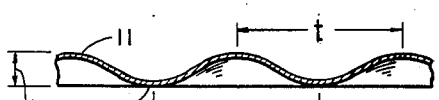
FIGURE 8 is a section taken on line 8—8 of FIGURE 6.

FIGURE 11 shows an arrangement in which the cages of ball bearings are mounted by means of tolerance rings according to the invention. There is shown a hub-shaped machine part 15 in which a rotary shaft 16 is journalled by means of two ball bearings. Each bearing comprises an outer cage ring 17 and an inner cage ring 18 between which the balls 19 of the bearing can rotate. The hub 15 has two radial bores 20 which form seating surfaces for the outer cages 17. The diameters of these bores are presumed to be formed with economically acceptable tolerances. The outer cages 17 are pressed into bores 20 each together with tolerance ring 10. The dimensions of the tolerance rings as to the gauge of the ring material, the spacing $t$ of the corrugations and the amplitude $h$ are selected in accordance with the desired fitting pressure. Similarly, the inner cages 18 are fitted upon the seating surface 21 of shaft 16 by interposing suitably dimensioned tolerance rings 10. The seating surface of the shaft and the diameter of the shaft at said seating surface can be manufactured with the usual comparatively wide tolerances so that the machining of the surfaces involved does not offer any difficulties. The tolerance rings according to the invention afford the additional advantage that the diameter of the shaft at the seating surface may be the same as the general diameter of the shaft. Hence, it is not necessary to provide special seating surfaces having a larger diameter than that of the shaft.

The provision and use of tolerance rings according to the invention for the fitting and mounting of bearings such as ball bearings, roller bearings or needle bearings, have also the advantage that it is not necessary to provide play for the bearings since any deformation of the cages of the bearings is avoided or absorbed by the springiness of the tolerance rings. Furthermore, the invention permits the seating of machine parts made of different metals within each other since coefficients of expansion of the parts are readily compensated by the springiness of the tolerance rings.

Figure 12:
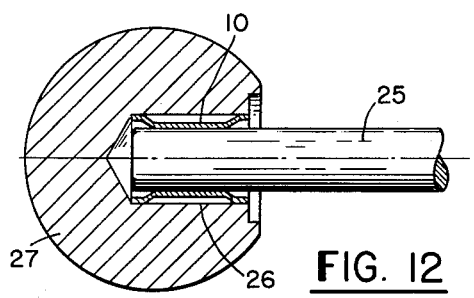
FIGURE 12 is a sectional view of the seating of a hand grip by a tolerance sleeve or ring according to the invention.

The tolerance rings or sleeves according to the invention also lend themselves readily for fitting a part such as a rod or bar in the bore of another part made of plastic. Heretofore, plastic parts such as grips or knobs had to be secured to bars, rods or levers practically exclusively by thread connections. It is virtually impossible, at least on an economic basis, to provide in a plastic part bores with dimensions accurate enough for a pressure fit. Furthermore, even the slightest deviations in the dimensions of a bore in a plastic part may result in a cracking thereof when the rod or other part is forced into the plastic part. FIGURE 12 shows the seating of a bar 25 in the bore 26 of a plastic knob 27. Bar 25 is frictionally secured in the bore by the interposition of a tolerance ring 10. As is evident, the load to which the tolerance ring is subjected is a static load. Obviously any other components subjected to a static load can be similarly joined with a pressure fit by tolerance rings according to the invention.

While the invention has been described in detail with respect to certain now preferred examples and embodiments of the invention, it will be understood by those skilled in the art after understanding the invention, that various changes and modifications may be made without departing from the spirit and scope of the invention, and it is intended, therefore, to cover all such changes and modifications in the appended claims.

We claim:

1. In a bearing, a tolerance ring for frictional engagement with each of a pair of radially spaced annular surfaces, said ring being formed of springy sheet metal as a generally cylindrical split sleeve, the improvements of a plurality of individual corrugations of substantial axial and radial extent formed in only the center portion of the circumferential surface of said ring and cooperatively defining an overall sinusoidal configuration, the curved radial extremities only of each of said corrugations being adapted to contact both of said annular surfaces in line contact therewith, the generally annular axial extremities of said ring lying outside the confines of said corrugations, respectively, and being of substantially constant radius at least as great as the radius of the inner annular surface and no greater than the radius of the outer of said annular surfaces, the corrugations having radially and axially tapered terminal portions blending smoothly into said axial extremities.

2. In a bearing, a tolerance ring as defined in claim 1, the further improvement of said axial extremities being in full circumferential contact with an inner one of said radially spaced surfaces and the corrugations lying radially outside the annular axial extremities to contact an outer one of said radially spaced surfaces.

3. In a bearing, a tolerance ring as defined in claim 1, the further improvement of said axial extremities being in full circumferential contact with an outer one of said radially spaced surfaces and the corrugations lying radially inside the annular axial extremities to contact an inner one of said radially spaced surfaces.

4. In a bearing, a tolerance ring for frictional engagement with each of a pair of radially spaced annular surfaces, said ring being formed of springy sheet metal as a generally cylindrical split sleeve, the improvements of a plurality of individual axially extending corrugations of substantial axial extent and radial depth embossed in the intermediate portions of the circumferential surface of said ring to form directly opposing concave and convex areas throughout the entire periphery of the ring, cooperatively defining an overall sinusoidal configuration, the curved radial extremities only of each of said said corrugations being adapted to contact both of said annular surfaces in line contact therewith, the generally annular axial extremities of said ring being smooth and lying axially outside the confines of said corrugations, respectively, and being of substantially constant radius at least as great as the radius of the inner annular surface and no greater than the radius of the outer annular surface, the corrugations having axially tapered segmental ellipsoidal terminal portions blending smoothly into said axial extremities.

References Cited in the file of this patent

UNITED STATES PATENTS

| | | |
|---|---|---|
| 1,290,180 | Halbleib | Jan. 7, 1919 |
| 1,384,173 | Wikander | July 12, 1921 |
| 2,931,412 | Wing | Apr. 5, 1960 |

UNITED STATES PATENT OFFICE
CERTIFICATE OF CORRECTION

Patent No. 3,061,386 October 30, 1962

Willy Dix et al.

It is hereby certified that error appears in the above numbered patent requiring correction and that the said Letters Patent should read as corrected below.

Column 3, line 40, for "forced" read -- formed --; column 5, line 12, for "sprininess" read -- springiness --.

Signed and sealed this 4th day of June 1963.

(SEAL)
Attest:

ERNEST W. SWIDER
Attesting Officer

DAVID L. LADD
Commissioner of Patents